United States Patent
Armellin

(10) Patent No.: US 6,530,408 B1
(45) Date of Patent: Mar. 11, 2003

(54) HIGH-TRANSVERSE-CURVATURE TIRE, IN PARTICULAR FOR A TWO-WHEELED VEHICLE

(75) Inventor: Giancarlo Armellin, Nova Milanese (IT)

(73) Assignee: Pirelli Coordinamento Pneumatici S.p.A., Milan (IT)

(*) Notice: Subject to any disclaimer, the term of this patent is extended or adjusted under 35 U.S.C. 154(b) by 0 days.

(21) Appl. No.: 09/200,928

(22) Filed: Nov. 30, 1998

Related U.S. Application Data

(62) Division of application No. 08/681,952, filed on Jul. 30, 1996, now Pat. No. 5,902,425.

(30) Foreign Application Priority Data

Aug. 1, 1995 (IT) .......................................... MI95A1681

(51) Int. Cl.[7] .............................. B60C 1/00; B60C 9/00; B60C 9/18; B60C 9/20; B60C 9/22
(52) U.S. Cl. ....................... 152/458; 152/526; 152/527; 152/531; 152/533; 152/540
(58) Field of Search ................ 152/454, 526, 152/458, 527, 531, 533, 540

(56) References Cited

U.S. PATENT DOCUMENTS

| | | | | |
|---|---|---|---|---|
| 4,112,994 A | * | 9/1978 | Mills et al. ............ | 152/454 X |
| 4,140,168 A | * | 2/1979 | Caretta ................... | 152/527 |
| 4,293,019 A | * | 10/1981 | Maiocchi ................ | 152/531 X |
| 5,032,198 A | * | 7/1991 | Kojima et al. .......... | 152/533 X |
| 5,355,926 A | * | 10/1994 | Takase ................... | 152/531 X |
| 5,396,943 A | * | 3/1995 | Takase ................... | 152/533 X |
| 5,407,006 A | * | 4/1995 | Giancola et al. ........ | 152/526 X |
| 5,562,792 A | * | 10/1996 | Caretta ................... | 152/533 X |
| 5,902,425 A | * | 5/1999 | Armellin ................ | 152/531 X |

FOREIGN PATENT DOCUMENTS

| | | | | |
|---|---|---|---|---|
| EP | 0235579 | | 9/1987 | |
| EP | 0329589 | | 8/1989 | |
| EP | 0 346 047 | * | 12/1989 | ................. 152/454 |
| EP | 0565339 | | 10/1993 | |
| GB | 2157239 | | 10/1985 | |
| GB | 2283215 | | 5/1995 | |
| JP | 56-71604 | * | 6/1981 | ................. 152/533 |

OTHER PUBLICATIONS

European Search Report, Apr. 23, 1996, 2 pages.
Abstract of EP 0 235 579 already of record.*

* cited by examiner

*Primary Examiner*—Adrienne C. Johnstone
(74) *Attorney, Agent, or Firm*—Finnegan, Henderson, Farabow, Garrett & Dunner, L.L.P.

(57) ABSTRACT

A front tire for two-wheeled vehicles comprising a carcass of toric form having a high transverse curvature and provided with a central crown and two sidewalls terminating in a pair of beads for anchoring to a corresponding mounting rim, a tread band located on the crown and a circumferentially-inextensible belt structure disposed between the carcass and tread band. The belt structure at a radially external position is comprised of a layer of cord coils substantially disposed at a zero angle to the equatorial plane of the tire in axial side-by-side relationship and extended from one axial extremity of the belt to the other axial extremity of the belt. The winding thickness of the cord coils increasingly grows from the equatorial plane to the belt axial extremities.

17 Claims, 3 Drawing Sheets

HIGH-TRANSVERSE-CURVATURE TIRE, IN PARTICULAR FOR A TWO-WHEELED VEHICLE

CROSS-REFERENCE TO RELATED APPLICATIONS

This application is a divisional of U.S. patent application Ser. No. 08/681,952, filed Jul. 30, 1996, now U.S. Pat. No. 5,902,425, the content of which is relied upon and incorporated herein by reference.

BACKGROUND OF THE INVENTION

The present invention relates to a high-transverse-curvature tire, in particular for motor-vehicles.

The invention is more particularly addressed to a front tire for two-wheeled vehicles in which the high transverse curvature is defined by particular values of the ratio between the height of the tread crown from a line passing through the tread axial width extremities, measured at the equatorial plane, and the distance between said tread extremities. This value, in any case at least as high as 0.3, is higher than that concerning the corresponding rear tire, which usually does not exceed 0.3.

In the following of the present description said ratio will be referred to as "curvature ratio" or, in a usual manner, as "tread camber".

It is known that a two-wheeled vehicle while travelling over a curvilinear path tilts on the side internal to the curve at an angle defined as the camber angle, which angle can reach values as high as 65° relative to a plane which is vertical to the plane of the ground; this operation brings the tires to a point to cause a slip thrust counteracting the centrifugal force acting on the vehicle.

It is also known that as the vehicle speed gradually increases and the radius of curvature of the path of travel gradually decreases, the tire tilting alone is not sufficient to compensate for the effect of the centrifugal force: therefore an increase in the slip thrust is required and this is achieved by tilting the rolling plane of the front tire relative to the tangential direction of the curvilinear path according to an angle referred to as "drift angle", by an operation carried out by the driver through steering the handlebar. In this manner the necessary increase in the slip thrust is achieved. Of course, as is well known, the rear tire cannot be steered.

In order to be able to create this greater slip thrust necessary to balance the centrifugal force effect, the front tire includes a belt, disposed between the carcass and the tread, said belt being formed of at least two radially superposed strips of cords symmetrically inclined to the equatorial plane of the tire.

This belt structure has a high stiffness, useful to generate appropriate thrust slips, which stiffness is however too great from the point of view of comfort, because the handlebar may only be controlled with a very strong effort, which will bring about weariness of the driver, and vibrations resulting from the road-bed unevenness are transmitted to the handlebar.

One could think of replacing the above mentioned belt made of strips of crossed cords with a more flexible belt structure provided with longitudinally-oriented cords which is capable of better taking up the ground unevenness. A tire of this type is described for example in the European Patent Application EP 0 565 339 A1; said tire is provided with a belt, between the carcass and tread, comprising at least one layer of zero-degree cords distributed in a configuration offering a greater thickness at the sides than in the middle.

More particularly, the cord amount in a given central area has a value of between 60% and 80% of the amount of cords close to the tire shoulders.

However, this solution is not feasible for many reasons; first of all because such a tire is not capable of developing important slip thrusts. In fact, the zero-degree cord layer does not offer a sufficient strength to the tangential forces acting in a direction transverse to the cord lying. Secondly, due to the substantial inextensibility of the cords, the zero-degree winding up must be carried out on a previously shaped support, in particular an auxiliary manufacturing drum suitably made convex, such as for example the drum described in U.S. Pat. No. 5,437,006 filed by the present Assignee, or directly on the previously shaped carcass.

However, making a zero-degree cord winding on said drum involves increasingly greater difficulties as the curvature increases, which difficulties can be overcome only with the aid of drums having a low transverse curvature and by virtue of the presence of an underlying rubberized layer promoting adhesion of the cord coils and preventing the wound end coils on the drum surface from slipping off.

In this case, it is pointed out that the rubberized layer has only the function of ensuring, by its adhesive character, the geometrical and structural stability of the layer of coils being formed as a result of winding of the cord on the drum, so that in the finished tire said rubberized layer is only a nuisance element increasing the tire cost and weight (which weight increase exactly occurs in the region where the centrifugal force takes the highest values) without involving any structural or behavioral advantage.

One could then think of making said tire with a belt comprising a layer of zero-degree cords and two layers of cords symmetrically inclined to the equatorial plane of the tire and also having the function of enabling winding of the coils around said drum; it is well apparent that this belt could not solve the problem coped with in the present invention, as it would have even more stiffness than the value requiring to be reduced.

For the above reasons, the usual tires for front wheels for motor-cycles generally have belt structures consisting of two superposed strips having crossed cords.

Such a fact implies another drawback to be added to the already mentioned great stiffness, which on the other hand is necessary. The ideal condition that one would like to reach in such a belt is that involving a low stiffness at the central tread portion which is engaged when the vehicle is running on a straight stretch, in which condition flexibility is more useful than stiffness, and a high stiffness at the tread extremities which are engaged when the vehicle is running on a curve, in which condition strong slip thrusts are necessary.

This differentiated stiffness could be achieved by grading the thickness values of the cords in the corresponding belt portions, but in practice this feature has not yet been achieved.

According to a first known manufacturing method, the two belt strips with crossed cords are disposed in a flat arrangement on the shaped carcass and the side portions of the strips are bent down onto the carcass sidewalls. Thus a greater thickness of the cords on the sidewalls is achieved, according to wishes. Unfortunately, this operation involves a very important deformation of the strips which must conform to the sidewall surface of the carcass of decreasing diameter and therefore causes a strong structural unevenness in the carcass of the finished tire.

According to another known manufacturing method, the belt is disposed in a flat arrangement on the carcass in the form of a cylindrical sleeve or on the already mentioned auxiliary manufacturing drum and the assembly is then expanded until a toric form is reached; the operation involves a reduction in the crossing angles between the strip cords and in the cord angle of each strip relative to the equatorial plane of the tire close to said plane, which will result in a greater thickness of the cords in the central area and lower thickness in the side areas of the belt.

Practically a cord thinning out is achieved where a greater thickness should be required and vice versa, so that the stiffness values are reversed with respect to the required optimal values.

In spite of the above, the last-mentioned manufacturing method is preferred for use, just to avoid the inconvenience of the structural unevenness encountered with the first manufacturing method.

The use of belt strips with zero-degree cords however has been already proposed in different publications.

U.S. Pat. No. 5,301,730 discloses a tire comprising a toric carcass, a tread band and a belt between the carcass and tread, in which the belt is formed of three cord layers and more particularly: a radially innermost layer with inextensible zero-degree cords, two layers radially external to the zero-degree layer and comprising cords crossed with each other according to given angles symmetrical to the equatorial plane.

It is apparent that the above tire represents the worst possible solution for achievement of the intended purposes: the accomplishment of a cord arrangement at an angle of zero degrees on the radially innermost outline requires the use of a rubberized layer to be interposed between the drum and the zero-degree winding, which will bring about many drawbacks.

On the other hand, due to its radially internal position, it is inappropriate to control the effects of the centrifugal stresses on the radially outermost layers having crossed cords, as these layers under the effect of said centrifugal forces can expand and thereby impair the belt stability and the integrity of the tire itself. Also known from German Patent DE 34 10 857 is a tire for motor-bikes comprising a radial carcass, a tread and a three-layered belt interposed between the carcass and tread. The belt is comprised of two layers of cords crossed with each other respectively at angles of 56° and 135° to the equatorial plane and a radially outermost layer of cords at an angle of zero degrees.

This solution has been already discussed beforehand and the greater stiffness of same relative to the known belts devoid of the zero-degree cord layer has already been emphasized.

SUMMARY OF THE INVENTION

Based on the above mentioned prior art, the Applicant has become aware of the fact that the problem to cope with could be solved by resorting to a belt comprising a layer of zero-degree cords supported by one or more underlying layers of reinforcing elements, by assigning predetermined arrangements to the zero-degree cords and the reinforcing elements, so as to simultaneously achieve the greatest structural evenness in the carcass, a high resistance to the centrifugal forces acting on the tire, and a differentiated stiffness between the belt center and extremities. The desired structure should at the same time ensure high comfort and appropriate slip thrust values so as through the support of said layers of reinforcing elements, to enable tire manufacturing steps to be carried out in which it is possible to wind up the zero-degree cords according to given tensions both in the middle and at the extremities of the belt, where the curvature effect gives rise to particular difficulties in winding the cord coils.

Accordingly, in one aspect the invention relates to a tire for two-wheeled vehicles comprising a carcass of toric form having a high transverse curvature and provided with a central crown and two sidewalls terminating in a pair of beads for anchoring to a corresponding mounting rim, a tread band located on said crown and having a curvature ratio at least as high as 0.3 and a circumferentially-inextensible belt structure disposed between said carcass and tread band, in which tire said belt structure at a radially external position is comprised of a layer of cord coils substantially disposed at a zero angle to the equatorial plane of the tire.

In another aspect, the invention relates to a tire for two-wheeled vehicles comprising a carcass of toric form having a high transverse curvature and provided with a central crown and two sidewalls terminating in a pair of beads for anchoring to a corresponding mounting rim, a tread band located on said crown and a circumferentially-inextensible belt structure disposed between said carcass and tread band, which belt comprises a radially external layer provided with a plurality of cord coils disposed at a substantially zero angle to the equatorial plane of the tire, in axial side-by-side relationship and extended from one extremity to the other extremity of said belt, and at least one radially internal layer provided with reinforcing elements oriented in a crossed direction relative to the equatorial plane of the tire, said tire having a curvature ratio or tread camber at least as high as 0.3.

In a further aspect, the invention relates to a tire of the above described type in which the thickness of the cord coils at zero degrees increasingly grows from the equatorial plane to the belt extremities according to a predetermined rule that keeps to a constant value the product of the mass of the cord coils disposed in a unitary portion of given value along the axial extension of said belt by the square of the distance between the center of said portion and the rotation axis of the tire, so as to cause a uniform tension state in the belt structure under the effect of the centrifugal force acting on the tire under working conditions.

More particularly, the distribution thickness of said cord coils at an angle of zero degrees is given by the following relation:

$$Nx = K \frac{R^2}{r^2} No$$

wherein:

No is the number of cord coils disposed in a central portion of unitary length located on either side of the equatorial plane;

R is the distance between the center of said portion and the rotation axis of the tire;

r is the distance between the center of the generic unitary portion included between the equatorial plane and the extremities of said radially external layer, and the rotation axis of the tire;

K is a parameter taking into account the constituent material and the cord formation, as well as the amount of rubber around the cord and the weight of the radially-internal layer section at said unitary portion which is variable with the occurrence of variations in the material type and structural features of the belt strips along the crown profile that diverge from the reference values.

In a further aspect, the invention relates to a tire for two-wheeled vehicles of the already described type, in which said zero-degree cords are distributed along the peripheral belt extension with an increasing thickness from the equatorial plane to the belt extremities in such a way that a correct distribution of the slip thrusts of an increasing amount towards the tread extremities is achieved, even in the presence of a more reduced thickness of the reinforcing elements in a radially internal position, due to the fact that the zero-degree cords, by getting thicker in an outwardly axial direction, compensate for the more reduced thickness values of the transverse reinforcing elements as compared with the usual values, and are tied with said transverse reinforcing elements, at the mutually crossing points, thereby giving the corresponding belt portion a high stiffness.

In accordance with the above aspect, the invention relates to a tire for two-wheeled vehicles comprising a carcass of toric form having a high transverse curvature and provided with a central crown and two sidewalls terminating in a pair of beads for anchoring to a corresponding mounting rim, a tread band located on said crown and a circumferentially-inextensible belt structure disposed between said carcass and tread band, which belt comprises a radially external layer provided with a plurality of cord coils disposed at a substantially zero angle to the equatorial plane of the tire, in axial side-by-side relationship and extended from one extremity to the other extremity of said belt, and at least one radially internal layer provided with reinforcing elements oriented in a crossed direction relative to the equatorial plane of the tire, characterized in that:

said tread band has a camber at least as high as 0.3,
the thickness of said cord coils increasingly grows from the equatorial plane to the belt extremities;
the thickness of said cord coils in a right section of unitary width placed on either side of the equatorial plane does not exceed 6 cords/cm.

Practically, according to the solution at the basis of the present invention, a belt which is simultaneously flexible in the middle, so that it can absorb and damper the vibrations due to ground unevenness, and rigid at the sides so that it is able to develop important slip thrusts, is achieved, by providing a central portion mainly having zero-degree cords together with a reduced amount or the complete absence of reinforcing elements oriented in a transverse direction, and side portions having both zero-degree cords and reinforcing elements oriented in a crossed direction relative to the equatorial plane.

According to a preferred embodiment, the radially external layer of said belt can comprise high-elongation metallic cords preferably made of high-carbon steel wires, as well as textile cords, in particular made of aramid.

The radially internal layer may comprise two radially superposed strips provided with reinforcing elements parallel to each other in each strip and crossed with the elements of the adjacent strip, symmetrically inclined to the equatorial plane of the tire; in this case the reinforcing elements in one of said strips can be of a material different from that of the reinforcing elements in the radially adjacent strip.

Alternatively, said layer may comprise one or more pairs of strips disposed axially in side-by-side relationship or spaced apart from each other, provided with reinforcing elements oriented in directions that are inclined to the equatorial plane of the tire and opposite to each other in each pair of side-by-side strips.

Alternative embodiments of the invention offering the same advantages provide for said reinforcing elements to be comprised of monofilaments and/or twisted yarns and cords thereof both of textile and metallic material.

In a different alternative embodiment, said radially internal layer consists of an elastomeric material layer charged with appropriate fibrous reinforcing fillings: according to the foregoing and to different convenient embodiments of the invention, said fibers can be of a material selected from the group consisting of textile, metallic or glass fibers disposed randomly or oriented according to a preferential direction inclined to said equatorial plane.

BRIEF DESCRIPTION OF THE DRAWINGS

The present invention will be more fully understood with the aid of the following description and the accompanying drawings, given for illustrative purposes only and not as a limitation, in which.

DETAILED DESCRIPTION OF PREFERRED EMBODIMENTS

It is known that, in order to be able to have a good directional stability and control of a vehicle, the front tire must have a reduced sectional width, which gives rise to the requirement of a strong transverse curvature in the tread, said strong transverse curvature being the cause of the difficulties set forth in the introductory part of the present invention.

The degree of this transverse curvature is defined by the particular ratio value between (a) the distance ht (measured along the equatorial plane X—X) of the tread crown from the line b—b passing through the tread extremities C and (b) the distance wt between said extremities (maximum tire width).

Figure 1:
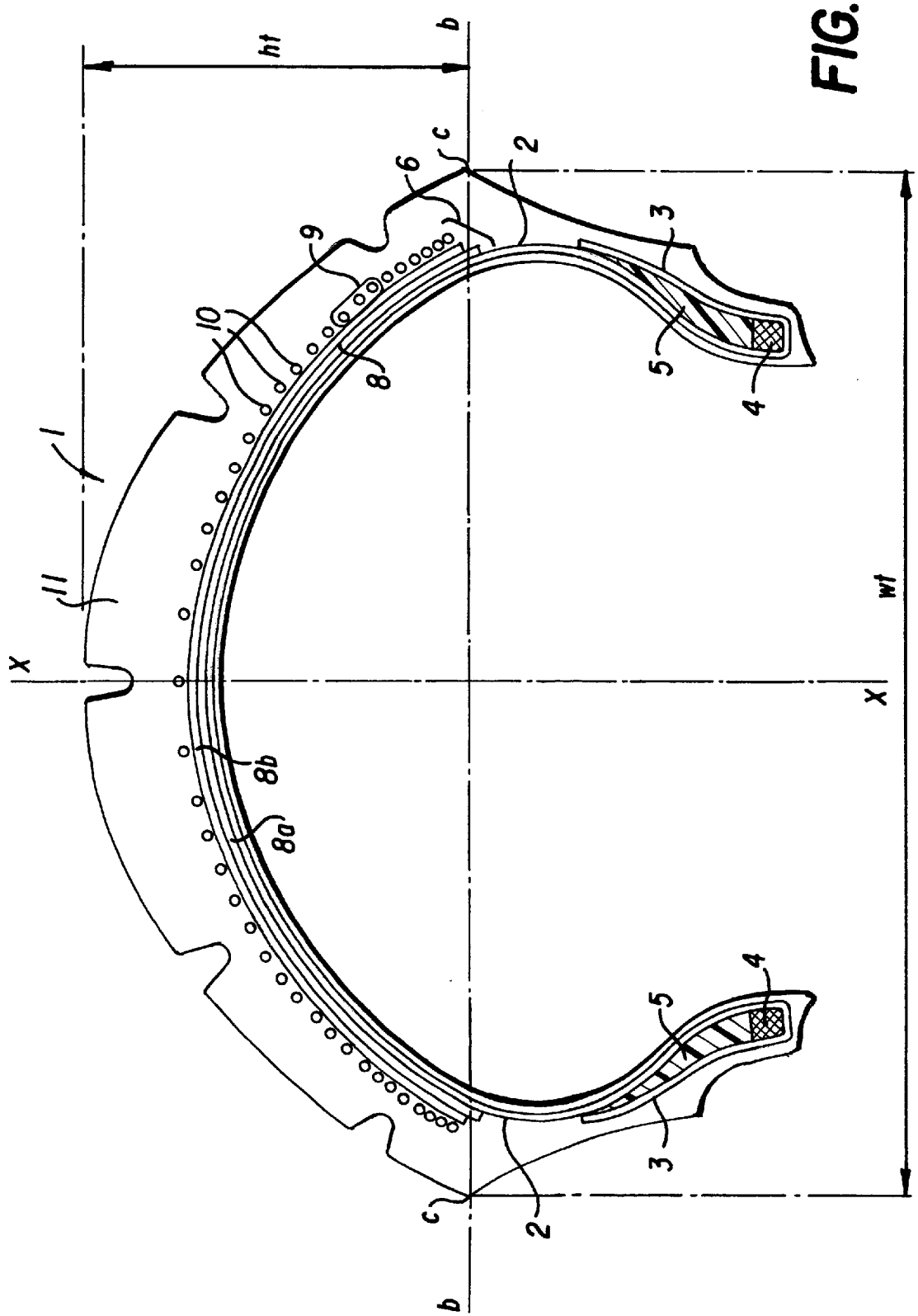
FIG. 1 shows an axial right section of a tire according to the invention.

If the tread extremities cannot be easily identified, for example due to lack of a precise reference such as the corner denoted by C in FIG. 1 for example, distance wt will be considered the measurement of the maximum chord of the tire.

As already disclosed, this ratio is referred to as curvature ratio or, preferably, "tread camber".

This value in front tires for two-wheeled vehicles is greater than 0.2 and always higher than the value of the corresponding rear tire having a camber of between 0.15 and 0.30.

On the other hand, the invention is not limited to tires for front wheels, but can efficiently and conveniently also apply to tires for rear wheels.

Tire 1 comprises a carcass provided with a reinforcing structure formed of at least one ply 2 of rubberized fabric, preferably but not exclusively of the radial type, the radial internal ends 3 of which are folded back around anchoring bead cores 4.

Between the sidewalls of the carcass ply 2 and the folded-back ends 3 fillers 5 are provided which are made of an elastomeric material and are disposed on the radially external surface of said bead cores 4.

It is known that the tire area comprising the bead core 4 and fillers 5 forms the tire bead intended for anchoring of the tire to a corresponding mounting rim, not shown.

At the crown (or radial outer portion) of the carcass, tire 1 comprises a belt structure 6 comprising of at least one radially external layer 9 and at least one radially internal layer 8 both comprised of structure reinforcing elements.

More particularly, the reinforcing elements of the radially external layer are cords 10 wound around the carcass in a circumferential direction, usually called "at zero degrees" with reference to its position relative to the equatorial plane of the tire.

The reinforcing elements of the radially internal layer can be individual threads/wires or cords of any appropriate material, in any case always oriented in a crossed direction to the equatorial plane, or reinforcing fillings such as fibrous fillings for example, disposed randomly but preferably oriented according to a preferred direction too, and crossed relative to the equatorial plane.

In the following present description, reference will be always made to cords, but it is pointed out that by this term also individual elementary threads/wires or untwisted yarns are meant, and the text allows this interpretation.

Finally, a tread band 11 is disposed in known manner on the belt 6.

Said tread band is provided with a tread pattern and is intended as the ground-contacting area of the tire.

Said radially external layer is formed of a plurality of distinct cords or at least one cord or one ribbon of few (preferably 2 to 5) cords wound up spiral-wise on the crown portion of the carcass according to a given pitch which is preferably variable and in any case has a variable thickness increasing from the center to the belt extremities.

In spite of the fact that spiralling by itself and the pitch variability involve a winding angle different from zero, this angle has always such a low value that it can substantially be considered as equal to zero degrees in relation to the equatorial or mid-circumferential plane.

It is further pointed out that a constant winding pitch along the perimeter extension 1 of the belt, by effect of the carcass curvature, gives rise in any case to a variable thickness in an axial direction.

In a convenient embodiment said cords 10 are the well-known high elongation (HE) metallic cords the use and features of which have already been widely described, for example, in the Italian Patent Application No. 20646 A/90 and corresponding U.S. Pat. No. 5,562,792 issued Oct. 8, 1996 in the name of the present Assignee.

In greater detail, these cords consist of a given number of strands (1 to 5, and preferably between 3 and 4), each strand being formed of a given number of individual wires, (2 to 10 and preferably between 4 and 7), each of a diameter greater than 0.10 mm, preferably included between 0.12 and 0.35 mm. The wires in the strands and the strands in the cord are helically wound together in the same direction, according to the same winding pitches or to different winding pitches for the wires and the strands. Preferably said cords are made of high-carbon (HT) steel wires, that is wires containing carbon in an amount greater than 0.9%. In particular, in a specific prototype prepared by the Applicant, the helical winding of layer 9 consisted of a single cord 10, known as 3×4×0.20 HE HT cord spiralled from one extremity of the belt to the other; this description identifies a metal cord formed of 3 strands each consisting of four elementary wires wound in the same direction as the strands and of a diameter corresponding to 0.20 mm; as is known the abbreviation HE means "high elongation" and the abbreviation HT means "high tensile" steel.

These cords have an ultimate elongation of between 4% and 8% and a typical well-known behavior to tensile stress, a so-called "spring behavior".

Due to this behavior, which on the other hand is desired, it is of the greatest importance to control the pre-loading condition of the zero-degree winding in the raw tire, before vulcanization.

This can be carried out to advantage, for example, by winding the cord or cords giving it/them a given tension around the radially internal layer previously disposed on the manufacturing drum: it is apparent that only a layer having sufficient mechanical strength can withstand winding of a tensioned cord without being torn, as discussed below.

As regards the different techniques of spiralling the cords about the carcass, they are well-known too and are not part of the invention and therefore are not illustrated herein.

Obviously, the preferred use of the metallic cords does not exclude the use of other cords, to the ends of the present invention; in particular, the well-known textile cords made of aramid fiber and commercially known as KEVLAR (trademark by DuPont) can be also employed.

In accordance with the present invention the distribution thickness of the cord 10 coils progressively varies along the layer from the equatorial plane towards the extremities, preferably following a predetermined relation.

In a particularly convenient embodiment, based on said relation it is provided that the product of the mass of the cord coils disposed in a unitary portion of given value by the square of the distance between the center of said portion and the rotation axis r—r of the tire should keep a substantially constant value over the whole axial extension of the belt in such a manner that during the tire rotation the resulting centrifugal forces in each of said portions have all the same value thereby giving rise to a given uniform stress condition from one extremity of the belt to the other one.

Figure 4:
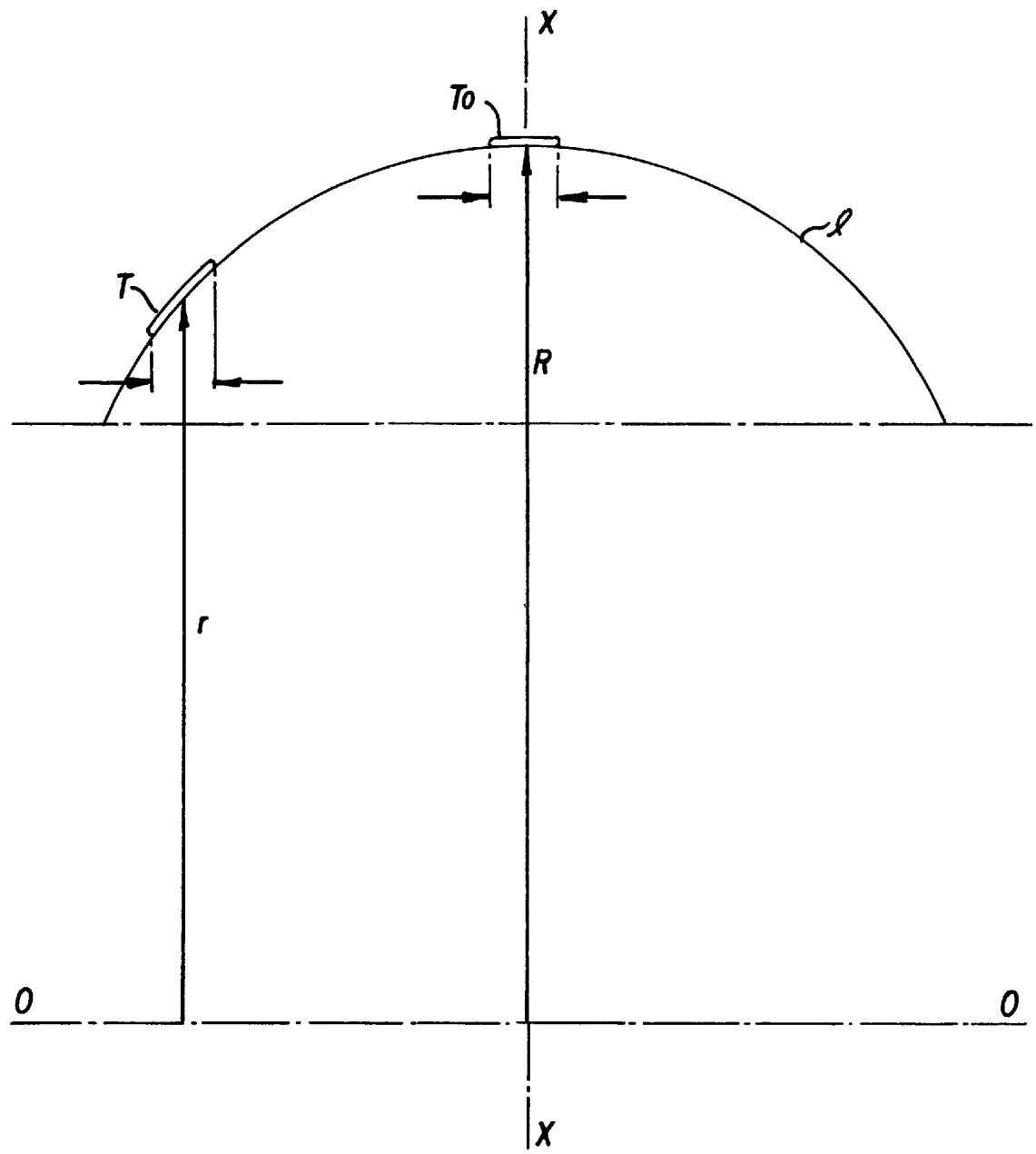
FIG. 4 is a diagrammatic and qualitative representation of a preferred example for distribution of the zero-degree cords along the axial extension l of the belt structure depending on the variable distance from the rotation axis r—r of the tire. A high-transverse-curvature tire for equipment of two-wheeled vehicles, particularly suitable for mounting to the front wheel of a motor-cycle, is identified by 1 in FIG. 1.

Conveniently, as simply and diagrammatically shown in FIG. 4, in which l shows the curvature outline of the lower layer 8, the axial thickness according to which the cord coils are distributed, is to be given by the following relation:

$$Nx = K\frac{R^2}{r^2}No$$

wherein:
No is the number of cord coils disposed in a central portion of unitary value, 1 cm for example, on either side of the equatorial plane;
R is the distance between the center of said central portion in the radially outermost layer and the rotation axis of the tire;
r is the distance between the center of one of said unitary portions located in the region between the center and the extremities of the radially outermost layer, and the rotation axis of the tire;
K is a parameter taking into account the constituent material and the cord formation, as well as the rubber amount around the cord and the weight of the section of the radially-internal layer at said unitary portion, which is variable with the occurrence of variations in the material type and structural features of the belt strips along the crown outline that diverge from the reference values.

This parameter will take a value substantially close to 1 in the case in which the cords have the same formation and all the connected materials are the same over the whole extension of the layers, and different values in connection with variations in the materials and the formation of the reinforcing elements along the peripheral extension of the belt.

By way of example only, it is possible to utilize one layer of zero-degree cords comprising textile (aramid) cords at a central position and metallic (HE) cords at the adjacent side sections, and vice versa.

Still by way of example, it is described the zero-degree cord layer made by the Applicant for the prototype tire used for carrying out comparative tests, illustrated in the following, with known tires of the prior art.

A steel HE RT 3×4×0.20 cord is selected the ultimate-elongation value of which is equal to 6% and which is rubberized in the usual manner, and a ribbon consisting of three side-by-side cords is formed in advance and spiralled around the carcass with an axial winding pitch of 7 mm and a tension of 400 grams or more. A 100 meter length of this band is 1.800 kg in weight; the band coil along the equatorial plane X—X of radius R=290 mm is 0.27 kg in weight.

Based on an evaluation criterion depending on the desired features (comfort, mechanical strength, stiffness) a value of 4 cords/cm was selected (see FIG. 4) as the number of coils No included within the portion To, located on either side of the equatorial plane, of a unitary length of 1 cm; the overall weight of the cord coils in said portion was 0.36 kg.

The product of this overall weight by the square of R identifies the constant value V designed to control the coil number and/or thickness and/or the cord type in any other unitary portion included between the equatorial plane X—X and the belt extremities.

For example, with reference to FIG. 4, considering the unitary portion T of radius r, it came out that the number Nx of coils of said cord in such a portion resulted from the following expression:

$$V = r^2 \, Pr$$

wherein Pr is the coil weight in portion T.

Clearly, the previously reproduced expressions only constitute a guide for selection of the optimal values, since generally values resulting from formulae (being variable in a continuous manner) do not coincide with the actually usable values which by their own nature vary in a discontinuous manner.

In other words, for a theoretical value of 3.64 cords/cm selection should be made between 3 and 4 cords/cm, or between 36 or 37 cords/dm at most, since the use of fractionary values is impossible.

Practically, from the preceding expression the following values were determined: the optimal number Nx of coils necessary for each portion; the resulting thickness of same along the peripheral belt extension, which was caused to vary from 4 to 7 cords/cm; and the resulting band-winding pitch, which was caused to vary from 7 to 5 mm, from the equatorial plane to the extremities.

As regards winding thickness of said cords at zero degrees in the area located on either side of the equatorial plane where the maximum thinning out takes place, it does not exceed 8 and preferably is included between 4 and 6 cords/cm.

Taking now into account the radially inner layer, several alternative embodiments are possible from which a person of ordinary skill in the art will be able to select the one more appropriate to the specific requirements.

First of all the layer may comprise two strips 8a, 8b of rubberized fabric consisting of reinforcing elements incorporated into an elastomeric matrix, oriented according to preferred directions crossing each other in the two strips and preferably symmetrically inclined in relation to the equatorial plane X—X, substantially in the same manner as the traditional belt of the prior art.

The important difference from the prior art belt resides in the more reduced stiffness of the present belt at a wide area "a" (of between 10% and 30% of the axial width of the belt) on either side of the equatorial plane; this more reduced stiffness can be conveniently achieved by acting either on the thickness of the reinforcing elements, or on the constituent material, or on the orientation of said elements to the equatorial plane, or on any other combination of the above expedients. This stiffness value can be expressed in different ways, for example by the thickness of said reinforcing elements (all other condition being equal), but more generally it is expressed by the modulus of elasticity or ultimate tensile stress of said radially internal belt layer, measured in the circumferential direction of the tire; said layer preferably will have a stiffness that does not exceed 65% of the stiffness of the equivalent belts in the known art.

Figure 2:
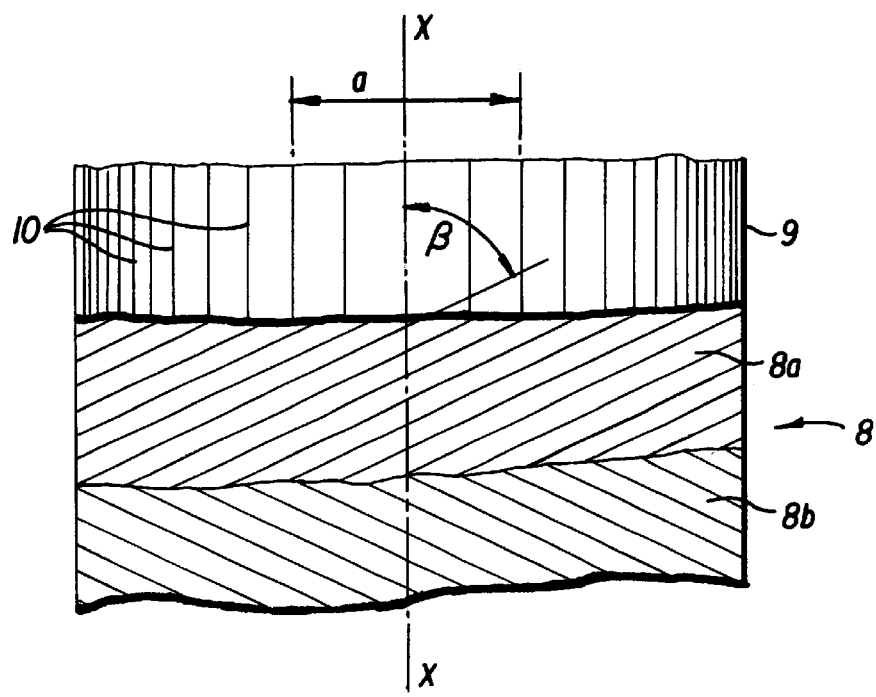
FIG. 2 is a diagrammatic exemplary plan view of a belt section in the absence of the underlying carcass, in a first convenient embodiment.
Figure 3:
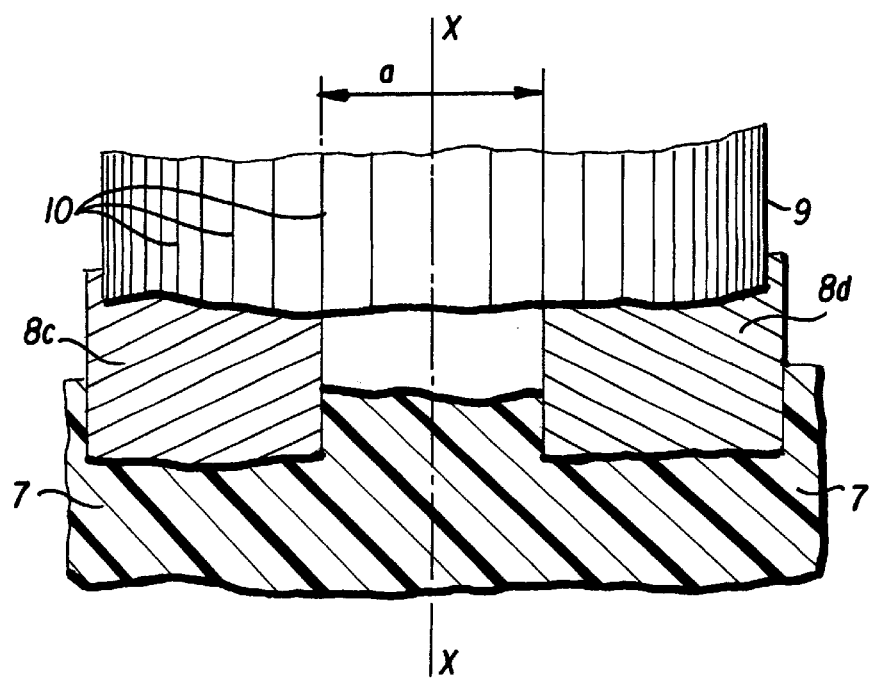
FIG. 3 shows, in the same view as in FIG. 2, two different alternative embodiments of the radially internal layer of said belt.

In particular, the material, structure and lying angles being equal, the overall thickness of the reinforcing elements crossing a right section of unitary width, on either side of the equatorial plane, in an oblique direction relative to said plane (as shown in FIG. 2) does not exceed, and preferably is lower than the usual thickness of the elements of said traditional belt, which is, as known, in the order of 14 cords/cm.

The angles formed by said cords relative to the equatorial plane are between 18° and 50° and preferably between 22° and 45°.

According to a convenient alternative version, said strips are even interrupted at the equatorial plane, giving rise to an area "a" of a width of between 10% and 30% of the axial extension of said belt, in which only circumferentially-directed reinforcing cords 10 are present. The end edges of said strips are in a stepped relationship, as currently occurs in the art.

The above described version has the advantage that appropriate thickness values can be selected in said strips for the side portions of the belt structure without correspondingly thickening the central crown portion of the belt structure.

In particular, it was found that for nylon (title 940/2) cords, thickness values of between 4 and 8 cords/cm were appropriate in combination with orientation angles relative to the radial direction of between 30° and 50°.

In a convenient manner, the reinforcing elements of said strips are monofilaments and/or twisted or untwisted yarns, and their cords are made either of varied textile materials, for example natural fibers such as rayon or cotton, or of synthetic fibers such as polyamide, nylon and aramid, or even of metal.

In a particular preferred embodiment, both strips comprise cords of the same material, whereas in another embodiment the cords of one strip are of a different material from those of the other strip, nylon-aramid or aramid-metal couplings being for example selected; in this case the angles of said cords included within the above described range are preferably different from each other and not symmetrical.

In an alternative solution the radially internal layer is formed of only two strips, disposed axially side by side along the peripheral outline, provided each (8c, 8d) with reinforcing elements oriented in a crossed direction inclined to the equatorial plane, so that the two strips give rise to a substantially herringbone configuration of the reinforcing elements. In this case too, the two side-by-side strips can be maintained close to each other or also joined along their facing longitudinal edges, or completely separated. In this case it is useful for the facing edges to keep the same axial width as pointed out above in the case of the superposed strips.

The previous remarks in connection with the constituent material, orientation and thickness of the reinforcing elements of said two strips also apply to the case of the individual strips as described just above.

In a further advantageous embodiment of the invention, said radially internal layer consists of a sheet 7 of elastomeric material, which is axially continuous or interrupted at the plane X—X, as already described, charged with a reinforcing filling consisting of short discontinuous fibers, optionally randomly dispersed within the elastomeric matrix but preferably substantially oriented in an axial direction or a direction inclined to the equatorial plane X—X of the tire, symmetrical with the direction of the adjacent sheet portion.

In this case one can no longer speak of fiber thickness, but one must take into account their distribution density per unit of volume: this density in preferably between 0.5% and 5% of the overall volume.

Conveniently, said fibrous reinforcing fillings are of a material selected from the group consisting of textile, metallic or glass fibers. In particular the use of short fibers formed with fibrils of aramid, better known as "aramid pulp" or "Kevlar-pulp" have proved to be convenient.

Manufacturing of the carcass bead cores using an aramid fiber has also proved to be convenient; the resulting structure has advantageously caused an improved flexibility of the tire beads facilitating fitting of the tire onto the rim, which fitting is made more difficult by the greater stiffness of the side sections of the tread, which on the other hand are sought-after and conveniently achieved in the tire and by the process of the invention.

In order to evaluate the qualitative results achieved by the tires of the invention, a series of road and track tests were carried out, and the tire of the invention was compared with equivalent tires, i.e. approved for the same type of operation and vehicle, of the best brands available on the market.

These tires were two tires of usual production manufactured by the Applicant and the tire of a different manufacturer, considered as the beat of the competitors' tires, under normal-drive and top-limit-drive conditions, respectively.

The features of the used vehicle are as follows:

| MOTOR-CYCLE | HONDA CBR 1000 |
|---|---|
| Front tire | size 120/70 ZR 17 |
| Inflation pressure | 2.5 bar |
| Rim | 3.50 - 17 |
| Rear tire | size 170/60 ZR 17 |
| Inflation pressure | 2.9 bar |
| Rim | 5.50 - 17 |

The road test consisted of evaluating the qualitative level of the most important behavioral drive features especially depending on the belt structure, giving a subjective judgement, converted to a score variable from 1 to 7, awarding the maximum score of the tire showing the best behavior in each of the considered features.

It should be noted that the effects of the individual structural features of the different compared tires which differ from each other by more than one feature are not evaluated separately, but it is analyzed only the overall behavior of the tire influenced by all the features of the finished product, even if mainly affected by the belt structure type.

On the other hand, the test exactly aimed at evaluating the overall effect of the invention in comparison with the best equivalent tires available on the market.

In any case, the tire of the invention had a radial two-ply carcass with nylon (title 940/2) cords, two radially-superposed belt strips provided with nylon (title 940/2) cords, symmetrically crossed with each other in the two strips, distributed according to a winding thickness of 6 cords/cm and inclined to an angle of 40° relative to the equatorial plane, which values were measured at the crown.

The radially external layer was made of metallic HE cords and consisted of a band winding as previously described.

On the contrary, the comparative tires substantially identical with each other had a radial two-ply carcass made of nylon (title 940/2), and only a pair of radially-superposed belt strips, provided with cords made of aramid (title 1100/2), symmetrically crossed with each other in the two strips, distributed according to a winding thickness of 9 cords/cm and inclined to an angle of 23° relative to the equatorial plane, according to the known art, which values were all measured at the tire crown.

In the following table the result of the comparison between the tire of the invention and said known tires is reproduced.

TABLE

| | TEST/TIRES | | | |
|---|---|---|---|---|
| | A | B | C | D |
| SENSITIVITY TO SHIMMY | 7 | 6 | 5.5 | 6 |
| DRIVE BEHAVIOR | 6.5 | 6.5 | 7 | 6.7 |
| SHOCK-ABSORBING CAPABILITY | 7 | 6 | | .5 |
| DIRECTIONAL STABILITY | 6.5 | 6.5 | 7 | 6.5 |
| BRAKING BEHAVIOR | 7 | 5 | 6 | |
| COMFORT | 7 | 5 | 6 | |

Tires are identified as follows:
A - Tire OF THE INVENTION
B - COMPETITION Tire
C - Tire MTR 01 by PIRELLI (Normal production)
D - Tire MEZ 2 by METZELER (Normal production)

One can see that the tire of the invention has a better performance level taken as a whole than that of the competitors, in particular a better level not only as regards the absorption capability of the road-bed unevenness, corresponding to expectations, but also and surprisingly, as regards the braking behavior, that is roadholding and braking distance.

The invention achieves all the intended purposes.

As regards the process of manufacture, the reinforcing layer at a position radially internal to the zero-degree cord layer, in particular at the side areas of the tread, of a rapidly decreasing diameter, constitutes a support element of appropriate consistence and mechanical strength, capable of enabling winding of the cord or cords at zero degrees on the manufacturing drum even under a tension of non-negligible value, in order to control the pre-loading condition of the winding in the raw tire.

As regards the tire behavior on the road, the combination of a zero-degree winding with a more internal reinforcing layer, in a single or double strip, optionally interrupted at the central tread section, enables the two and conflicting requirements of a high flexibility of the belt under running conditions on a straight stretch and high stiffness for withstanding slip thrusts during a running on a curve, to be balanced.

In particular, by acting on thickness values of the reinforcing elements taken as a whole and on the lying angles of the reinforcing elements in the lower layer, differentiated thickness values of the belt from one area to another can be determined, so as to give an improved roadholding ability to the tire and simultaneously a high comfort level to the driver.

It was also unexpectedly found that the greater capability of deformation of the belt, allowed by the presence of a layer having zero-degree reinforcing elements and a graduation of the thickness value of the elements in an axial direction, enables the achievement of a ground-contacting area in the tire that increases on braking, which results in a lower braking distance required by the vehicle, so that safety on driving is increased.

The evenness of the stress state to which the tire as a whole and in particular the radially-external belt layer is subjected under high-speed conditions is finally emphasized.

In fact, as described, by controlling the axial distribution of the zero-degree cords by means of the previously indicated relation fixing the number of the cord coils disposed in one portion of unitary value depending on the localized belt diameter, it is possible to submit at least the crown portion of the tire to a constant stress, under the effect of the centrifugal force, both at the tread center and at the extremities, where the effect of the diameter reduction is more considerable.

Therefore the absence of stresses of high value localized at some points rather than others takes place over the whole belt, which will bring about an improvement in the tire service life.

It is apparent that the present description only has an explanatory and not restrictive function and therefore all modifications and variations not expressly illustrated but that can be easily deduced by a person of ordinary skill in the art must be considered within the scope of the present invention as defined in the appended claims.

What is claimed is:

1. A front tire for two-wheeled vehicles, comprising:
   a carcass of toric form having a high transverse curvature and provided with a central crown and two sidewalls terminating in a pair of beads for anchoring to a corresponding mounting rim;
   a tread band located on the crown; and
   a circumferentially-inextensible belt structure disposed between the carcass and the tread band;
   wherein the belt structure, at a radially-external position, comprises a layer of cord coils substantially disposed at a zero angle to an equatorial plane of the tire in axial side-by-side relationship and extended from one axial extremity of the belt structure to an opposite axial extremity of the belt structure,
   wherein the belt structure has at most one layer of the cord coils substantially disposed at the zero angle to the equatorial plane and at least one radially-internal layer provided with reinforcing elements oriented in a crossed direction relative to the equatorial plane,
   wherein a winding density of the cord coils in the layer grows from the equatorial plane to the axial extremities of the belt structure,
   wherein the winding density of the cord coils, in a right section of unitary width located on either side of the equatorial plane, is greater than or equal to 4 cords/cm and less than or equal to 8 cords/cm, and
   wherein a winding density of the reinforcing elements crossing the right section of unitary width is less than or equal to 9 cords/cm.

2. The tire of claim 1, wherein the winding density, according to which the cord coils are distributed along the axial extension of the belt structure, is given by the following relation:

$$Nx = K \frac{R^2}{r^2} No$$

wherein:
   No is a number of cord coils disposed in a central portion of unitary length located on either side of the equatorial plane;
   R is a distance between a center of a portion of the belt structure, between axial extremities of the radially-external layer, and a rotation axis of the tire, the portion of the belt structure having a plurality of unitary portions;
   r is a distance between the center of a respective unitary portion, included between the equatorial plane and the axial extremities of the radially-external layer, and the rotation axis of the tire; and
   K is a parameter taking into account a constituent material and a cord formation, as well as an amount of rubber around the cord coils and a weight of the at least one radially-internal layer at the respective unitary portion, which varies with variations in material type and structural features of the at least one radially-internal layer along a crown profile that diverges from reference values.

3. The tire of claim 1, wherein the winding density of the cord coils is greater than or equal to 4 cords/cm and less than or equal to 6 cords/cm.

4. The tire of claim 1, wherein the cord coils are coils of metallic high-elongation cord made of high-carbon steel wires.

5. The tire of claim 1, wherein the cord coils are coils of textile cord made of aramid.

6. The tire of claim 1, wherein the at least one radially-internal layer comprises first and second strips disposed axially in side-by-side relationship,
   wherein each of the strips comprises the reinforcing elements, and
   wherein the reinforcing elements in the first strip are oriented in a direction opposite to the reinforcing elements in the second strip, relative to the equatorial plane.

7. The tire of claim 1, wherein the at least one radially-internal layer comprises, on each side of the equatorial plane, two radially-superposed strips,
   wherein each of the strips comprises the reinforcing elements, and
   wherein, on each side of the equatorial plane, the reinforcing elements in a first strip are in a direction opposite to the reinforcing elements in a second strip, relative to the equatorial plane.

8. The fire of claim 7, wherein, on at least one side of the equatorial plane, the reinforcing elements in the first strip are made of a different material than the reinforcing elements in the second strip.

9. The tire of claim 1, wherein the reinforcing elements in the at least one radially-internal layer comprise at least one of textile cords and metallic cords.

10. The tire of claim 1, wherein the at least one radially-internal layer consists of a sheet of elastomeric material charged with fibrous reinforcing fillings dispersed in an elastomeric matrix.

11. The tire of claim 10, wherein the fibrous reinforcing fillings are made of a material selected from the group comprising textile fibers, metallic fibers, and glass fibers.

12. The tire of claim 10, wherein the fibrous reinforcing fillings are short fibers formed with fibrils of aramid.

13. The tire of claim 10, wherein the fibrous reinforcing fillings are oriented along a preferred direction inclined to the equatorial plane.

14. The tire of claim 10, wherein the fibrous reinforcing fillings are dispersed in the elastomeric matrix according to a density per unit volume between 0.5% and 5% of an overall volume.

15. The tire of claim 1, wherein the at least one radially-internal layer is interrupted at the equatorial plane over a portion of a width between 10% and 30% of an axial width of the belt structure.

16. The tire of claim 1, wherein the beads comprise bead cores of aramid fiber.

17. The tire of claim 1, wherein the winding density of the cord coils in the layer grows across an entire axial distance from the equatorial plane to the respective axial extremities of the belt structure.

* * * * *